INVENTOR
Noel D. Hazzard
By Wayne Lang
AGENT

United States Patent Office 3,209,058
Patented Sept. 28, 1965

3,209,058
HIGH TEMPERATURE ROTOR
Noel D. Hazzard, Wellsville, N.Y., assignor, by mesne assignments, to The Air Preheater Company, Inc., a corporation of Delaware
Filed Aug. 4, 1960, Ser. No. 47,402
4 Claims. (Cl. 264—261)

The present invention relates to rotary regenerative heat exchange apparatus and more particularly it relates to rotary regenerative heat exchange apparatus of a type that is adapted for use in zones of very high temperature as represented by my co-pending U.S. application No. 28,980 filed May 13, 1960, now Patent No. 3,101,778.

In rotary regenerative heat exchange apparatus a mass of heat exchange material carried in a rotor is first positioned in a passageway for a heating fluid where it absorbs heat from the fluid flowing therethrough, and upon turning the rotor about its axis, the heated heat exchange material is positioned in a spaced fluid passageway where it is free to transfer its absorbed heat to a fluid to be heated. The rotor is surrounded by a housing having end or sector plates formed with openings therein to provide for the passage of fluids, and to prevent their mingling, sealing means are provided at the ends of the rotor to wipe against or pass in closely spaced relation with imperforate portion of the adjacent housing structure.

Rotary regenerative heat exchange apparatus of this type provides an efficient method of heat transfer and its use is quite common at temperatures that lie within the working range of steel or its various alloys that are commonly used to comprise the heat exchanger structure. However, for temperatures that lie above the working range of steel as may frequently prevail in various process applications, it has been necessary to utilize ceramic materials for the heat absorbent mass, and in certain instances for the supporting heat exchanger structure.

The majority of ceramic materials that might find utility in this type of aplication are relatively brittle and prone to breakage when subjected to the thermal stresses that exist under operating conditions of varying temperature. Various attempts have been made to preclude distortion or to find ways to permit a limited amount of distortion without adversely affecting the structure or its operation. However, such attempts have proved generally uneconomic and offer little in the practical solution of problems relating to the transfer of heat at high temperatures.

Therefore, the chief object of this invention is to provide a novel arrangement for a ceramic rotor in a rotary regenerative heat exchanger that is not adversely affected by temperature variation or thermal shock.

A further object of the invention is to provide a method of economically forming a rotor for a rotary regenerative heat exchanger of temperature resistant ceramic materials.

The exact manner in which these objects are carried out will be readily understood when viewed in conjunction with the accompanying drawings in which.

Figure 1:
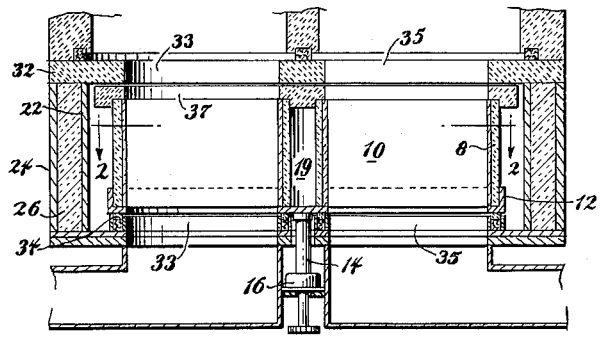
FIGURE 1 is a sectional elevation showing a rotary regenerative heat exchanger according to the invention.
Figure 2:
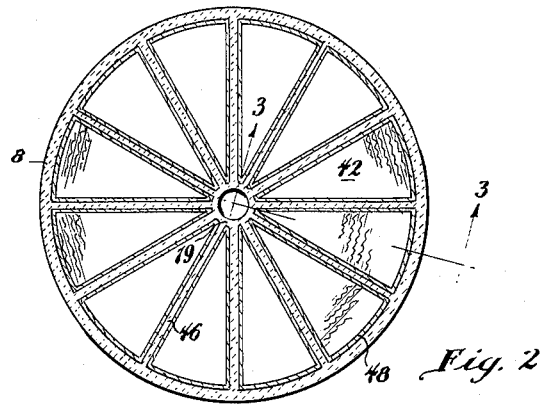
FIGURE 2 is a sectional view of the rotor as seen from line 2—2 of FIGURE 1.
Figure 3:
FIGURE 3 is radial section of the rotor as seen from line 3—3 of FIGURE 2.

In the drawing the numeral 8 represents the cylindrical shell of a rotor 10 that carries a mass of perforate heat absorbent element alternately between a heating fluid and fluid to be heated. The rotor rests upon the annular periphery of a metallic spider 12 located at the "cold end" of the rotor where the deleterious effects of corrosion and heat are at a minimum. The rotor is in turn carried by a trunnion 14 that is supported by a bearing 16 and rotated about its axis by suitable motive means not illustrated.

The rotor is surrounded by a housing that comprises a ceramic liner 22 within a steel casing 24, the annular space therebetween being packed with an insulating material 26 of resilient ceramic fiber.

The rotor housing is provided at opposite ends thereof with ceramic end or sector plates 32 and 34 having apertures 33 and 35 conducting the flow of heating fluid and a fluid to be heated to and through the heat transfer element carried by the rotor. A ceramic sealing plate 37 having an annular rim connected to a hub portion by radial spokes in alignment with the partitions between blocks of heat transfer element is pivotally carried by the upper end of the rotor post 19. This sealing plate provides a floating sealing surface that adjusts itself to the plane of the adjacent sector plate to compensate for axial deformation or misalignment of the rotor. A resilient packing of fibrous ceramic material is inserted between the imperforate surface of sealing plate 37 and the adjacent edge of the rotor to provide a sealing medium that expands or contracts as required to occupy the varying space between relatively moving elements and thereby preclude the flow of fluid thereby.

The particular improvement of this invention is to be found in the rotor element and the unique method of forming the rotor in order that it will be capable of withstanding the physical and thermal shock to which such a rotor is normally subjected, and in order that it may be economically produced.

Thus the basic element comprises a block of ceramic heat absorbent element 42 having a multiplicity of passageways permitting fluid flow therethrough. Each such block of element is formed substantially sector shaped in order that a series element so formed may be arranged radially about a central point in spaced relation to provide a series of radial spaces between adjacent element blocks. Before assembly each sector-shaped element block 42 is surrounded on its radial sides and its arcuate outer surface with a layer of resilient ceramic packing 48. The exact form of the resilient packing is not deemed critical but it must have sufficient resiliency to closely follow the irregular contours of an element block in the manner possible with a fibrous ceramic blanket, and it must have a thickness greater than the expansion that accompanies an element block when heated through a normal range of temperature.

After the sectorial element blocks 42 have been individually wrapped with the resilient packing and have been arranged radially in the manner defined, an annular form (not illustrated) is placed around the assembled blocks to provide an annular space between the arcuate outer surface of the element blocks and the annular form that is interconnected with the radial spaces lying between adjacent element blocks.

Subsequently a castable ceramic material that hardens upon drying is poured into the radial spaces between blocks, the center portion 16 and the annular space around the assembled blocks to provide the annular shell structure 8 with interconnected radial partitions 46. Because of its fluid nature when first poured, the castable ceramic material penetrates the voids in the outer surface of the ceramic packing 48 surrounding the element blocks 42 and upon drying grips the adjacent fibers of said packing to firmly support them and the enclosed element blocks 42. Also the pressure of the fluid castable material when first poured forces the resilient blanket into the irregularities in the surface of the enclosed element block to thereby hold it more securely and provide an efficient bond that precludes fluid flow between the element block and the surrounding ceramic blanket.

When properly hardened and cured the rotor may be removed from the annular form as a single unit with the series of independent radially disposed sector shaped element blocks 42 resiliently but firmly held in place whereby the individual element blocks are free to expand or contract in any direction without adversely affecting the surrounding housing structure.

The axial edges of the radial partitions 46 and the annular shell 8 may be ground planed to provide a smooth sealing surface adapted to cooperate with the plane surface of an adjacent sealing plate and thereby reduce to a minimum all fluid therebetween.

A rotor assembly formed according to the disclosed manner combines flexibility of operation with ease and economy of manufacture, and as such provides a basic improvement in the manufacture of ceramic heat exchange apparatus.

While this invention has been described with reference to the embodiment illustrated in the drawing, it is evident that various changes may be made in its fabrication without departure from the spirit of the invention and it is intended that all matter contained in the above description or shown in the accompanying drawings shall be interpreted as illustrative and not in a limiting sense.

What I claim is:

1. The method of forming a series of sector shaped ceramic blocks of axially perforate heat absorbent element into a composite rotor for a rotary regenerative heat exchanger comprising the steps of surrounding the radial sides and arcuate outer surface of each sector shaped block in closely abutting relationship with a layer of resilient packing; arranging the series of element blocks radially in spaced relation about a common center to provide a series of radial spaces between adjacent element blocks and pouring a castable ceramic material into the radial spaces between the layers of resilient packing that surround spaced element blocks and in an annular band extending around the assembled element blocks that upon drying grips the resilient packing surrounding the blocks and bonds them into a composite cylindrical rotor.

2. The method of combining a series of independent sector shaped blocks of axially perforate heat absorbent element into a composite cylindrical rotor for a rotary regenerative heat exchanger comprising the steps of wrapping the radial side surface and arcuate outer surface of each sector shaped element block with a layer of resilient packing; arranging the element blocks radially about a central point in spaced relation to provide a series of radial spaces between adjacent blocks and pouring a castable ceramic material into the radial spaces between element blocks and in an annular band extending around the assembled element blocks that upon drying grips the resilient packing surrounding the blocks and bonds them into a composite cylindrical rotor.

3. The method of combining a series of independent sector shaped blocks of axially perforate heat absorbent element into a composite cylindrical rotor for a rotary regenerative heat exchanger comprising the steps of wrapping a blanket of resilient ceramic packing around the radial sides and arcuate outer surface of each sector shaped element block; arranging the element blocks radially about a central point in spaced relation to provide a series of radial spaces between adjacent blocks; and pouring a castable ceramic material into the spaces between element blocks and in an annular band surrounding the assembled element that upon drying forms imperforate radial partitions between element blocks interconnected at their outer ends with a cylindrical rotor shell.

4. The method of combining a series of independent sector shaped blocks of axially perforate heat exchange element into a composite cylindrical rotor for a rotary regenerative heat exchanger comprising the steps of wrapping a layer of resilient ceramic packing around the radial sides and arcuate outer surface of each sector shaped element block; arranging the series of sector-shaped element blocks radially about a central point in spaced relation to provide a series of radial spaces between adjacent element blocks; and pouring a castable ceramic material into the spaces between element blocks and in an annular band surrounding the assembled element that upon hardening provides a rotor structure that grips the outer surface of the resilient material surrounding each element block and bonds the assembled element blocks into a composite cylinder wherein each element block thereof is free to distort unencumbered by the surrounding structure.

References Cited by the Examiner

UNITED STATES PATENTS

| | | | |
|---|---|---|---|
| 1,539,148 | 5/25 | Sylvester | 18—61 |
| 1,883,736 | 10/32 | Cotterman | 18—59 |
| 2,266,510 | 12/41 | Pottinger | 18—59 |
| 2,572,580 | 10/51 | Almroth et al. | 18—59 |
| 2,781,554 | 2/57 | Robinson | 264—261 |
| 2,793,130 | 5/57 | Shannon et al. | |
| 2,825,221 | 3/58 | Brouls. | |
| 2,972,783 | 2/61 | Russell et al. | 25—154 XR |

OTHER REFERENCES

Polylite Polyester Resins, Reichold Chemicals, Inc., July 30, 1958.

Reinforced Plastics, Plastic Industry, August 1951, pp. 19 to 21 and 23.

ROBERT F. WHITE, *Primary Examiner.*

ARTHUR P. KENT, WILLIAM J. STEPHENSON, ALEXANDER H. BRODMERKEL, *Examiners.*